(No Model.)
W. R. DE VOE.
CONDUIT ELECTRIC RAILWAY.
No. 510,061. Patented Dec. 5, 1893.
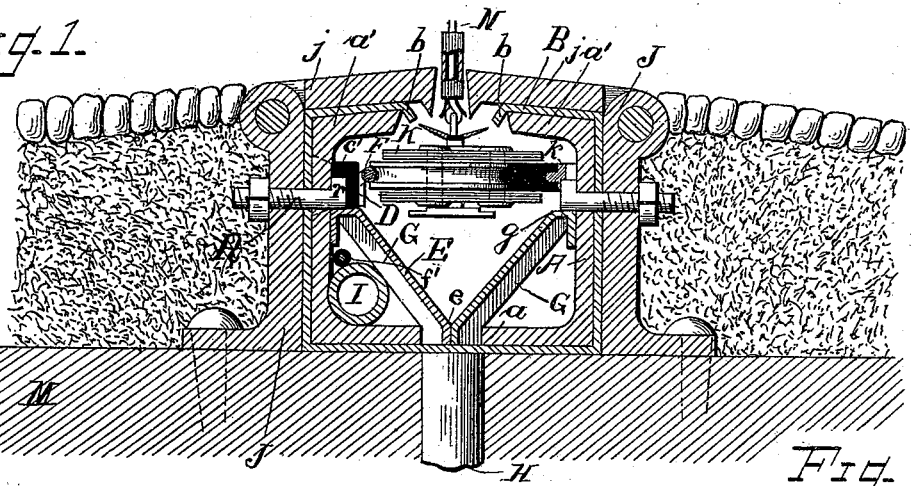
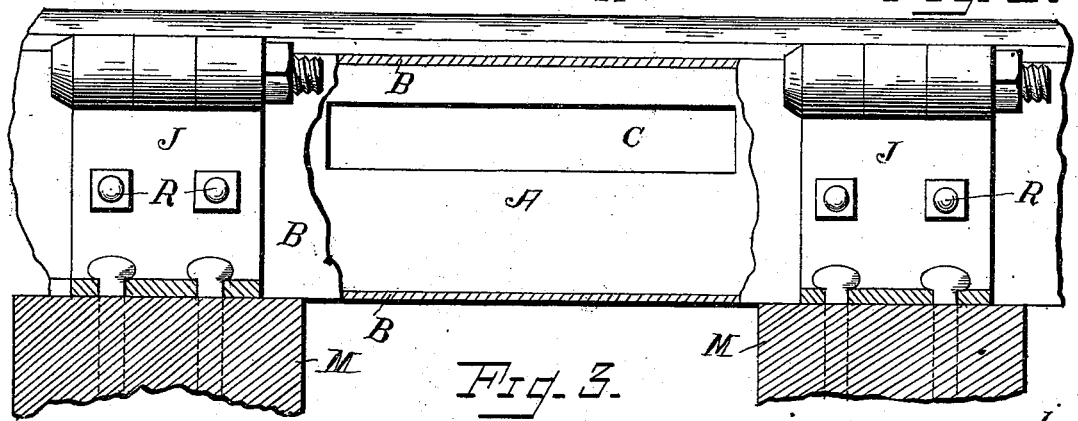
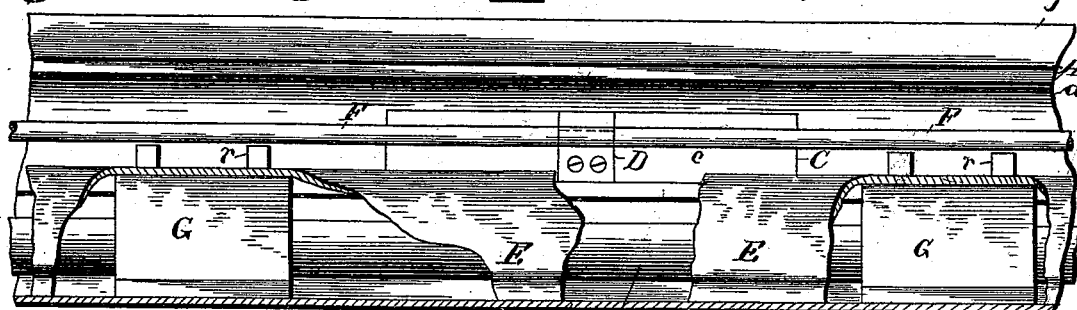
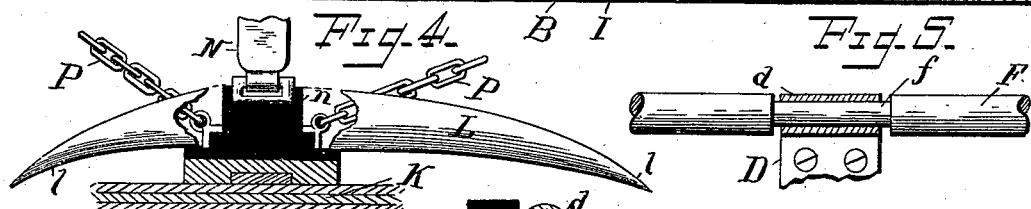
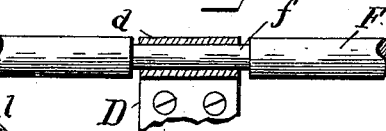
WITNESSES
Howard D. Orr
J. H. Griffin
INVENTOR
William R. De Voe
By M. D. Peck
His attorney
THE NATIONAL LITHOGRAPHING COMPANY,
WASHINGTON, D. C.

UNITED STATES PATENT OFFICE.

WILLIAM R. DE VOE, OF SHREVEPORT, LOUISIANA, ASSIGNOR OF SEVEN-TWELFTHS TO C. W. DAWLEY, OF DALLAS, TEXAS, AND PATRICK B. CASH, OF SHREVEPORT, LOUISIANA.

CONDUIT ELECTRIC RAILWAY.

SPECIFICATION forming part of Letters Patent No. 510,061, dated December 5, 1893.

Application filed June 12, 1893. Serial No. 477,358. (No model.)

*To all whom it may concern:*

Be it known that I, WILLIAM R. DE VOE, a citizen of the United States, residing at Shreveport, in Caddo parish and State of Louisiana, have invented certain new and useful Improvements in Conduits for Electric Railways; and I do hereby declare the following to be a full, clear, and exact description of the invention, such as will enable others skilled in the art to which it appertains to make and use the same, reference being had to the accompanying drawings, which form part of this specification.

My invention relates to under ground conduits for conductors used to convey a current of electricity to propel railway cars; and a trolley to be used in connection therewith, the object being to improve the construction of the conduit whereby it may be thoroughly drained and kept practically free from moisture; also to provide a suitable attachment to the trolley whereby it is protected from the dirt and water which is likely to enter the conduit through the slot, and to this end my invention consists in the construction and arrangement of parts hereinafter fully described and more particularly pointed out in the claims.

Referring to the drawings, Figure 1, is a vertical transverse section of my improved conduit with the trolley in position therein. Fig. 2, is a side elevation of the conduit with lead casing partially broken away. Fig. 3, shows a vertical longitudinal section of the conduit, certain parts being broken away. Fig. 4, is a side elevation of the attachment for the trolley. Fig. 5, is a detached view of a part of the conductor and one of its securing clips, and, Fig. 6, is an enlarged sectional view of the clip for holding the line wire.

Similar letters of reference indicate corresponding parts in each figure of the drawings.

The conduit is supported on the ordinary ties or sleepers beneath the track and surface of the road-bed, and is formed of two conduit irons A which may extend the entire length of the conduit, or be made to occupy only the same space in length as the angle irons on the outer side, and arranged parallel to each other, their horizontal bases $a$, extending inwardly toward each other to near a meeting point as shown in Fig. 1.

A sheet of lead, or sheet metal treated with litho carbon, B is interposed between the horizontal bases $a$, of the conduit irons A and the ties M, and extends upwardly and inwardly to inclose the entire outer surface of the conduit irons. The edges $b$, of the sheet lead covering are bent at an obtuse angle over the inner edges of the upper inclined projecting arms or portions $a'$ of the conduit irons. The object of this outer sheeting or lead covering is to prevent moisture from entering the conduit from the surrounding earth.

The conduit irons A are provided at intervals in their length with longitudinal slots C in which any suitable insulating material, as wood or vulcanite $c$, may be inserted. If the slot C is filled with wood it is desirable that an additional insulator formed of vulcanite $c'$ as shown in Fig. 1, be attached thereto and extend into the conduit; but when the slot C is filled with vulcanite the same piece may be made to project inwardly avoiding the necessity of attaching an additional piece or insulator.

The insulator $c'$ has clips D secured thereto which are provided with a bent or looped portion $d$, adapted to fit over the line conductor F, the latter being reduced in diameter or recessed as shown at $f$, to fit into the looped portion $d$, which is bent around it leaving the outer surface of the conductor and loop flush with each other. The conductor F is provided with a feed wire $f'$ which is located in any convenient place in the conduit, and is attached to the conductor at suitable points for reinforcing the current in the regular line when it is desired.

E represents a trough extending the entire length of the conduit, made of sheet metal and of V shape in cross section. The inclined sides of the trough are supported at suitable intervals by braces G, the lower ends of which rest on the lead sheeting B, and inclose between them the lower edge e, of the sheet forming the trough. The upper edges g, of the trough are bent over the top edges of the braces and abut against the vertical portions of the conduit iron A. This trough conducts all water that may fall in through the slot above the conduit into a drain pipe H arranged at suitable intervals leading from the conduit to a sewer below or at the side of the road-bed.

I represents a heating pipe which extends the entire length of the conduit in the triangular shaped space formed on one side by the brace G and the base and vertical portion of the conduit iron A. The object of this heating pipe is to enable the temperature of the conduit to be kept sufficiently high to prevent the condensation of moisture therein which might in some degree interfere with the operation of the current of electricity used for operating the car. Any desired form of heat may be used in the pipe that is found most economical and useful for the purpose intended, as hot air, steam, gas, or the pipe may be constructed for heat by electricity or by any well known means.

On the outer side of the sheet lead covering of the conduit irons A, are angle irons J placed at suitable intervals along the conduit, which are firmly secured to the ties or sleepers M by spikes, and to the double conduit irons A by bolts R having a square head r on the inner side of the conduit. These angle irons J form supports to which the top section plates j, are hinged at intervals, and upon which the unhinged top plates rest along the entire course of the conduit. These top plates normally rest on the lead covering over the upper inclined projecting portions a' of the conduit irons A.

Within the conduit there is a horizontal trolley K supported on the tracks k upon one side, and upon the line conductor F on the other side. From the upper side of the trolley there is extended a conductor N which passes up through the slot between the top plates j, and is secured in the usual way to the motor on the car above. This conductor is protected by a suitable insulation to prevent contact with the edges of the top plates. On the top of the trolley there is secured an open crescent like shield L the wing portions of which extend upward and outward from each side and their upper edges curved downward from the center of their length to a point at their ends, while the bottom forms substantially a downward curve from over the trolley to its ends l, for the purpose of facilitating the discharge of water, dirt or other substance which readily runs or falls off that may chance to fall through the slot of the conduit on to the shield. This shield is somewhat wider than the slot between the top plates, and is arranged upon the trolley to be carried directly under the slot and longitudinally therewith. The conductor N passes through the bottom of the shield and is provided with an insulator n, to prevent its coming in direct contact therewith when the shield is made of metal. As the trolley is formed of three wheels united in any well known manner and is longer than it is broad, the conductor N is secured nearer one end of the trolley rather than in the center, which necessitates the shield extending at a greater distance upon one side of the conductor N than upon the other, as is clearly shown in Fig. 4. By this construction of shield any water, dirt or other matter is prevented from dropping on to the trolley and is discharged from the shield over the front and rear ends of the trolley, and falls into the trough E below.

The ordinary chain or other usual cable means P is secured to the trolley and passes up through the slot between the top plate and is attached to the under side of the car for the purpose of drawing the trolley in the conduit and relieving the conductor N from the strain that would otherwise be upon it.

Having thus fully described my invention, what I claim as new, and desire to secure by Letters Patent of the United States, is—

1. In an underground conduit for electric conductors, the combination with conduit irons forming the bottoms and sides thereof with inwardly inclined projecting arms at their upper ends and a lead covering beneath and on the outer side of said irons and extending inwardly over the top of their arms, of a V shaped sheet metal trough extending the length of the conduit having its inclined sides supported by braces resting on the lead covering below, the lower ends of said braces inclosing the lower edge of the metal sheet forming the trough and the upper edges of the sheet being bent over the upper ends of the braces and resting against said conduit irons, substantially as and for the purpose set forth.

2. In an underground conduit for electrical conductors, the combination with conduit irons forming the sides thereof, and having elongated slots therein, of insulating material supported in said slots and looped clips secured to said material for supporting the line conductor, as and for the purpose set forth.

3. In an under ground conduit the combination with a conductor having a reduced portion, of a clip having a loop or bent portion to fit over the recess of the conductor to bring the exterior surfaces of the conductor and loop portion of the clip flush with each other, as and for the purpose set forth.

4. In an underground conduit for electric conductors, the combination with a trolley adapted to run in the conduit, of a crescent like shield secured over the trolley and immediately beneath the slot of the conduit, said shield having wing portions extending upward and outward from its sides, the upper edges of said wing portions being curved downward from the center of their length, to
5 their outer ends and the bottom of the shield being curved downward from over the trolley to its ends, as and for the purpose set forth.

In testimony whereof I affix my signature in presence of two witnesses.

WM. R. DE VOE.

Witnesses:
    J. JOLLY JONES,
    J. H. GRIFFIN.